US012288938B2

(12) United States Patent
Lee et al.

(10) Patent No.: US 12,288,938 B2
(45) Date of Patent: Apr. 29, 2025

(54) MICROSTRIP ANTENNA

(71) Applicant: ALPHA NETWORKS INC., Hsinchu (TW)

(72) Inventors: Yi-Ju Lee, Hsinchu (TW); Shiao-Fan Chen, Hsinchu (TW)

(73) Assignee: ALPHA NETWORKS INC., Hsinchu (TW)

( * ) Notice: Subject to any disclaimer, the term of this patent is extended or adjusted under 35 U.S.C. 154(b) by 240 days.

(21) Appl. No.: 18/072,418

(22) Filed: Nov. 30, 2022

(65) Prior Publication Data

US 2024/0039162 A1 Feb. 1, 2024

(30) Foreign Application Priority Data

Jul. 28, 2022 (TW) .................................. 111128447

(51) Int. Cl.
*H01Q 9/04* (2006.01)
*H01P 3/08* (2006.01)

(52) U.S. Cl.
CPC ............. *H01Q 9/0457* (2013.01); *H01P 3/08* (2013.01)

(58) Field of Classification Search
CPC ...... H01Q 9/0457; H01Q 21/065; H01P 3/08; H01P 5/028; H01P 7/082
See application file for complete search history.

(56) References Cited

U.S. PATENT DOCUMENTS 11,757,194 B2 * 9/2023 Byun ................... H01Q 9/0457 343/720
2023/0361446 A1 * 11/2023 Maruyama .............. H01P 3/165

FOREIGN PATENT DOCUMENTS

CN 108493589 A 9/2018
CN 108879087 A 11/2018
CN 110165413 A 8/2019
CN 110581368 A 12/2019
JP 1-276901 A 11/1989
(Continued)

OTHER PUBLICATIONS

Andre N. da Silva, Rafaela G. G. de Carvalho, Adaildo G. D'Assuncao Junior, Adaildo G. D'Assuncao; A New Technique Using Axially Slotted Microstrip Line for Antenna Impedance Matching Designs; Jun. 2019; Journal of Microwaves, Optoelectronics and Electromagnetic Applications, vol. 18, No. 2 (Year: 2019).*
(Continued)

*Primary Examiner* — David E Lotter
(74) *Attorney, Agent, or Firm* — Birch, Stewart, Kolasch & Birch, LLP

(57) ABSTRACT

A microstrip antenna includes a substrate, a feedline, an impedance matching structure, and a patch radiator, wherein the substrate has a surface. The feedline is disposed on the surface and extends along a first axial direction. The impedance matching structure is disposed on the surface and has a first end and a second end in the first axial direction, wherein the first end is connected to the feedline. The impedance matching structure has a stepped impedance change. The patch radiator is disposed on the surface, wherein the patch radiator and the second end of the impedance matching structure are adjacent and spaced by a distance in the first axial direction, and the second end of the impedance matching structure is coupled with the patch radiator through the distance. Therefore, a bandwidth of the microstrip antenna could be increased.

6 Claims, 10 Drawing Sheets

(56) References Cited

FOREIGN PATENT DOCUMENTS

| | | | |
|---|---|---|---|
| JP | 6-85526 | A | 3/1994 |
| JP | 2003-51709 | A | 2/2003 |

OTHER PUBLICATIONS

Taiwanese Search Report for Taiwanese Application No. 111128447, dated Apr. 10, 2023, with English translation.

* cited by examiner

MICROSTRIP ANTENNA

BACKGROUND OF THE INVENTION

Technical Field

The present invention relates generally to an antenna, and more particularly to a microstrip antenna.

Description of Related Art

With the development of technology, the uses of wireless signals, such as data transmission, radar, etc., increase gradually. A bandwidth of the wireless signal depends on a structure of an antenna no matter what the use of the wireless signal is. Therefore, increasing the bandwidth of the antenna is one of the directions of research and innovation.

For example, in the use of radar, a conventional embedded microstrip antenna 100 is shown in FIG. 1 and includes a substrate 10, a feedline 12, and a patch radiator 14. In order to illustrate easily, a first axial direction X, a second axial direction Y, and a third axial direction Z which are perpendicular to one another should be interpreted from a perspective view in FIG. 1.

The substrate 10 is made of RO4350. The feedline 12 and the patch radiator 14 construct a metal layer 16 and are disposed on a top surface of the substrate 10, and another metal layer 18 is disposed on a bottom surface of the substrate 10. A side of the patch radiator 14 closer to the feedline 12 has a recess 142, and the feedline 12 feeds into the recess 142 and is connected to the patch radiator 14. Both a thickness the metal layer 16 in the third axial direction Z and a thickness of the metal layer 18 in the third axial direction Z are 0.05 mm. Referring to FIG. 1, a width W of the feedline 12 in the second axial direction Y is 0.197 mm, a length L1 of the feedline 12 in the first axial direction X is 1.4 mm, a length L2 of a part of the patch radiator 14 in the second axial direction Y is 0.2465 mm, a length L3 of another part of the patch radiator 14 in the second axial direction Y is 0.513 mm, a length L5 of still another part of the patch radiator 14 in the second axial direction Y is 1.716 mm, and a length L4 of the patch radiator 14 in the first axial direction X is 1.9135 mm.

FIG. 2 is a schematic view showing a S11 return loss of the conventional embedded microstrip antenna 100 operating between 60 GHz and 64 GHz frequency, wherein a frequency of the conventional embedded microstrip antenna 100 at −10 dB is between 61.63 GHz and 63.1 GHz (i.e., a bandwidth of the conventional embedded microstrip antenna 100 is 1.47 GHz), and a fractional bandwidth (FBW) of the conventional embedded microstrip antenna 100 is about 2.357%.

FIG. 3 is a schematic view showing a radiation pattern in a Y-Z plane and a radiation pattern in an X-Z plane of the conventional embedded microstrip antenna 100 operating at 60 GHz and shows that a peak gain of the conventional embedded microstrip antenna 100 is about 6.8 dBi, wherein the Y-Z plane is a plane constructed by the second axial direction Y and the third axial direction Z, and the X-Z plane is a plane constructed by the first axial direction X and the third axial direction Z.

In the use of radar, a resolution of the antenna is directly proportional to the bandwidth of the antenna. The larger the bandwidth of the antenna is, the larger the resolution of the antenna is, and the more updated information detected by the radar. However, as an impedance of the feedline 12 of the conventional embedded microstrip antenna 100 is 50 ohms and an area of the patch radiator 14 is relatively larger than an area of the feedline 12, an impedance of the patch radiator 14 is much smaller than the impedance of the feedline 12. As the feedline 12 directly feeds into the patch radiator 14 with the smaller impedance, the impedance from the feedline 12 to the patch radiator 14 greatly decreases, causing a large energy loss caused by a rapid impedance change, thereby affecting the bandwidth of the antenna.

Therefore, the conventional embedded microstrip antenna 100 still has room for improvement.

BRIEF SUMMARY OF THE INVENTION

In view of the above, the primary objective of the present invention is to provide a microstrip antenna which could increase a bandwidth of an antenna.

The present invention provides a microstrip antenna including a substrate, a feedline, an impedance matching structure, and a patch radiator, wherein the substrate has a surface. The feedline is disposed on the surface and extends along a first axial direction. The impedance matching structure is disposed on the surface and has a first end and a second end in the first axial direction, wherein the first end is connected to the feedline. The impedance matching structure has a first section, a second section, and a third section in the first axial direction, wherein the first section has the first end, the third section has the second end, and the second section is located between the first section and the third section. The first section has a first width in a second axial direction perpendicular to the first axial direction, the second section has a second width in the second axial direction, and the third section has a third width in the second axial direction, wherein the second width is smaller than the first width and the third width. The patch radiator is disposed on the surface. The patch radiator and the second end of the impedance matching structure are adjacent and spaced by a distance in the first axial direction, and the second end of the impedance matching structure is coupled with the patch radiator through the distance.

With the aforementioned design, as an energy is fed into the patch radiator in a coupling way through the stepped impedance change and the distance, an energy loss caused by the impedance change could be reduced and the bandwidth of the antenna could be increased, thereby providing a greater resolution.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
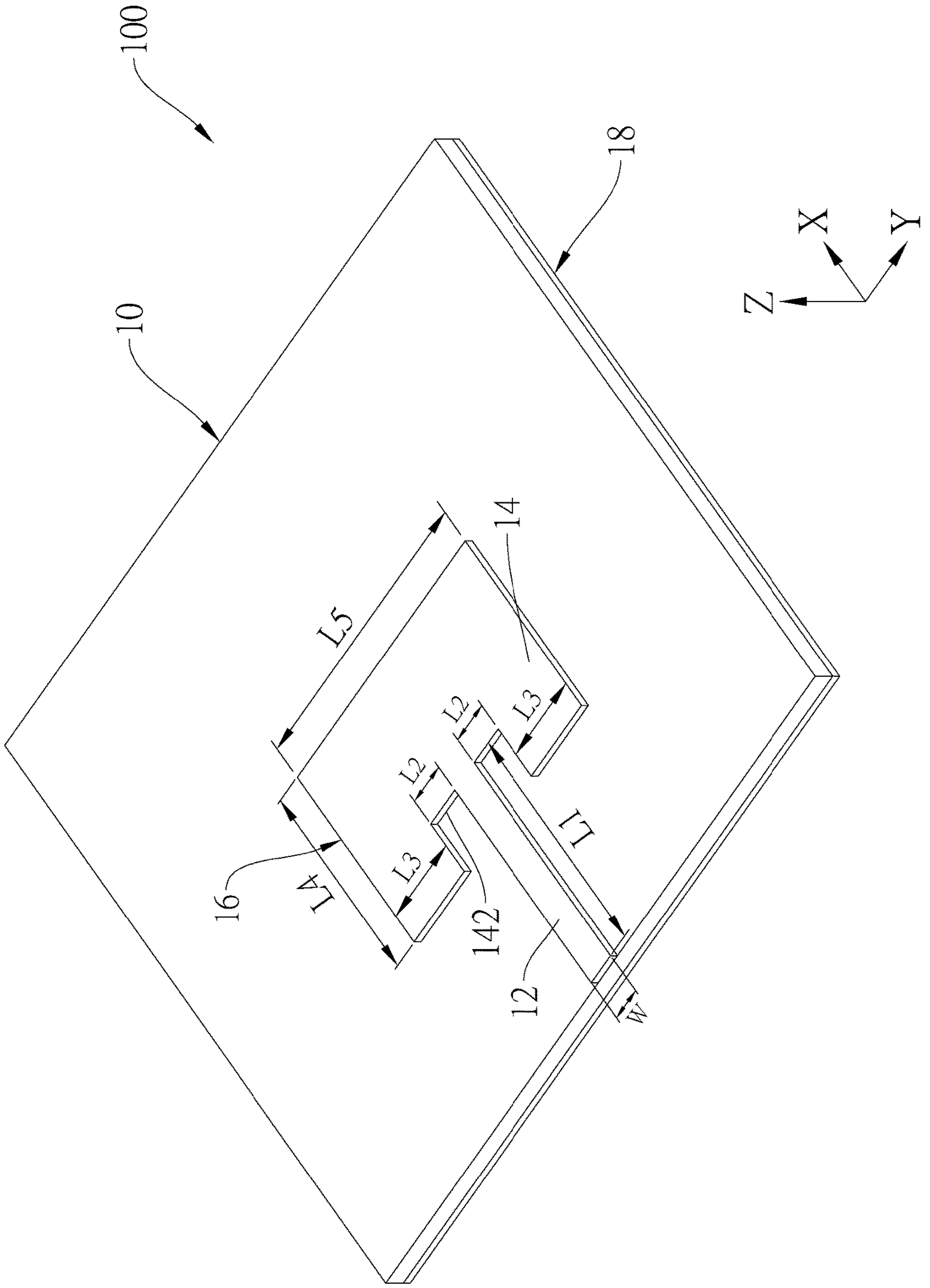
FIG.1 (PRIOR ART)
FIG. 1 is a perspective view of the conventional embedded microstrip antenna.
Figure 2:
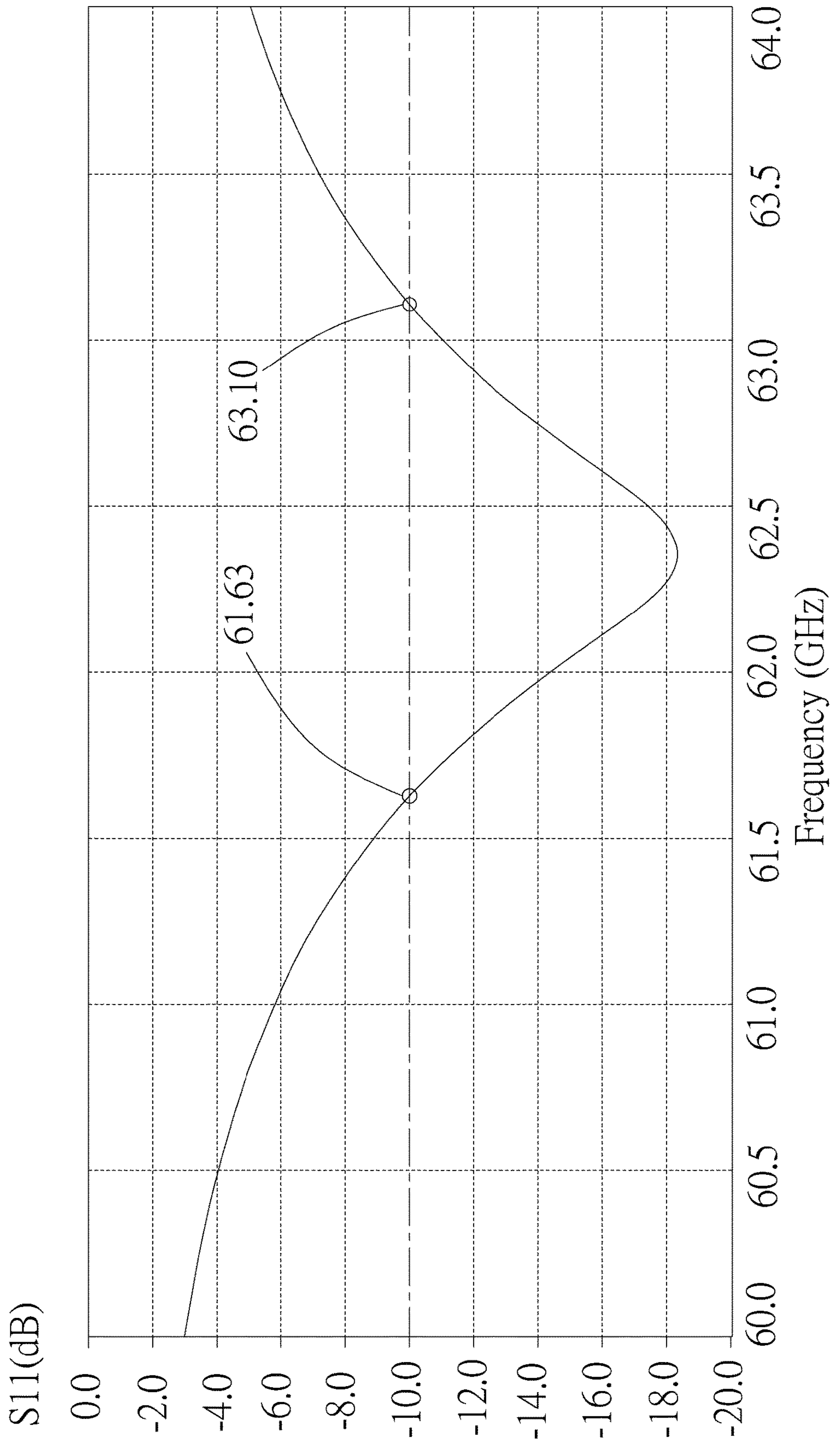
FIG.2 (PRIOR ART)
FIG. 2 is a schematic view showing a return loss of the convention embedded microstrip antenna operating between 60 GHz and 64 GHz.
Figure 3:
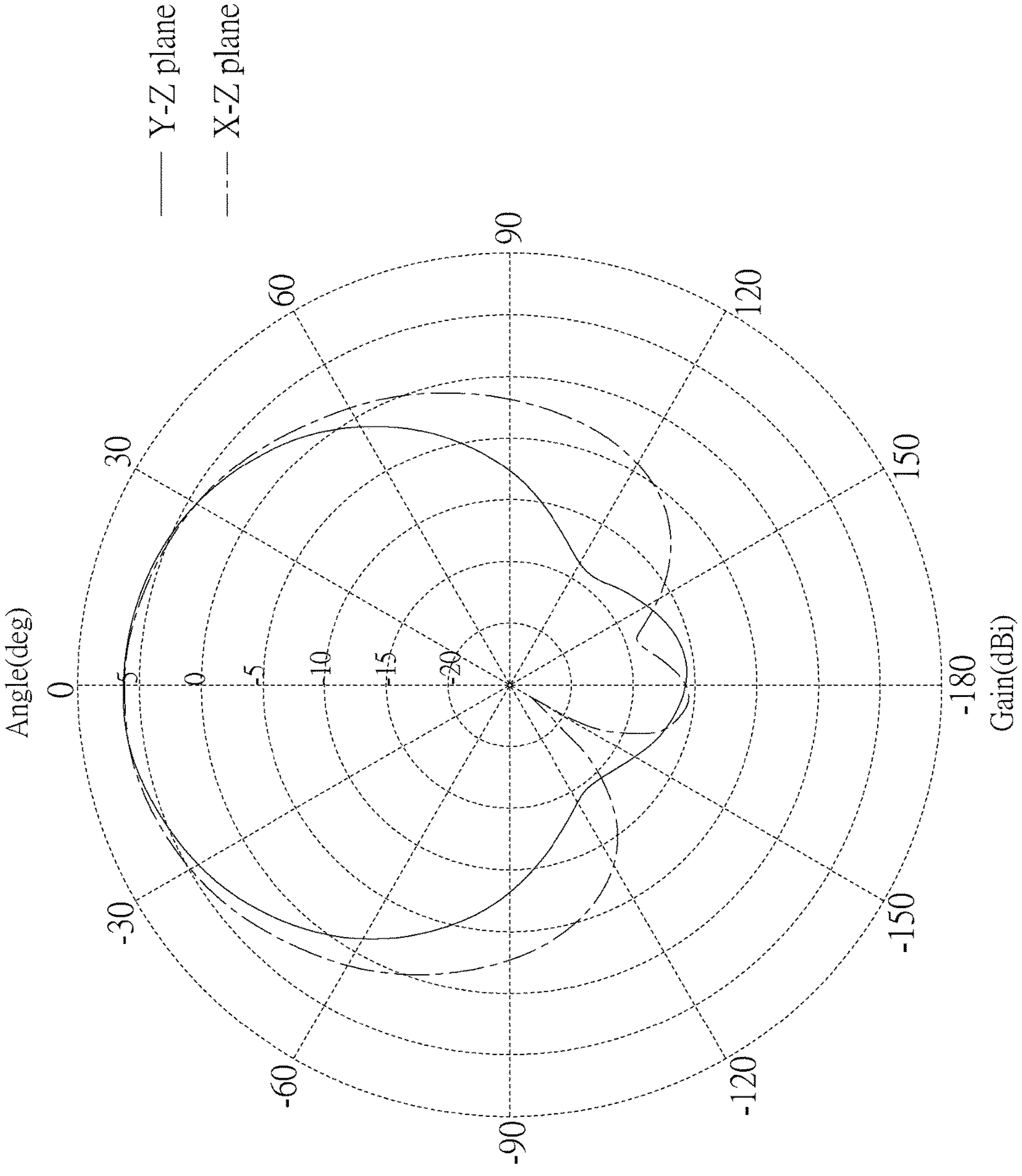
FIG.3 (PRIOR ART)
FIG. 3 is a schematic view showing a radiation pattern of the conventional embedded microstrip antenna operating at 60 GHz.
Figure 4:
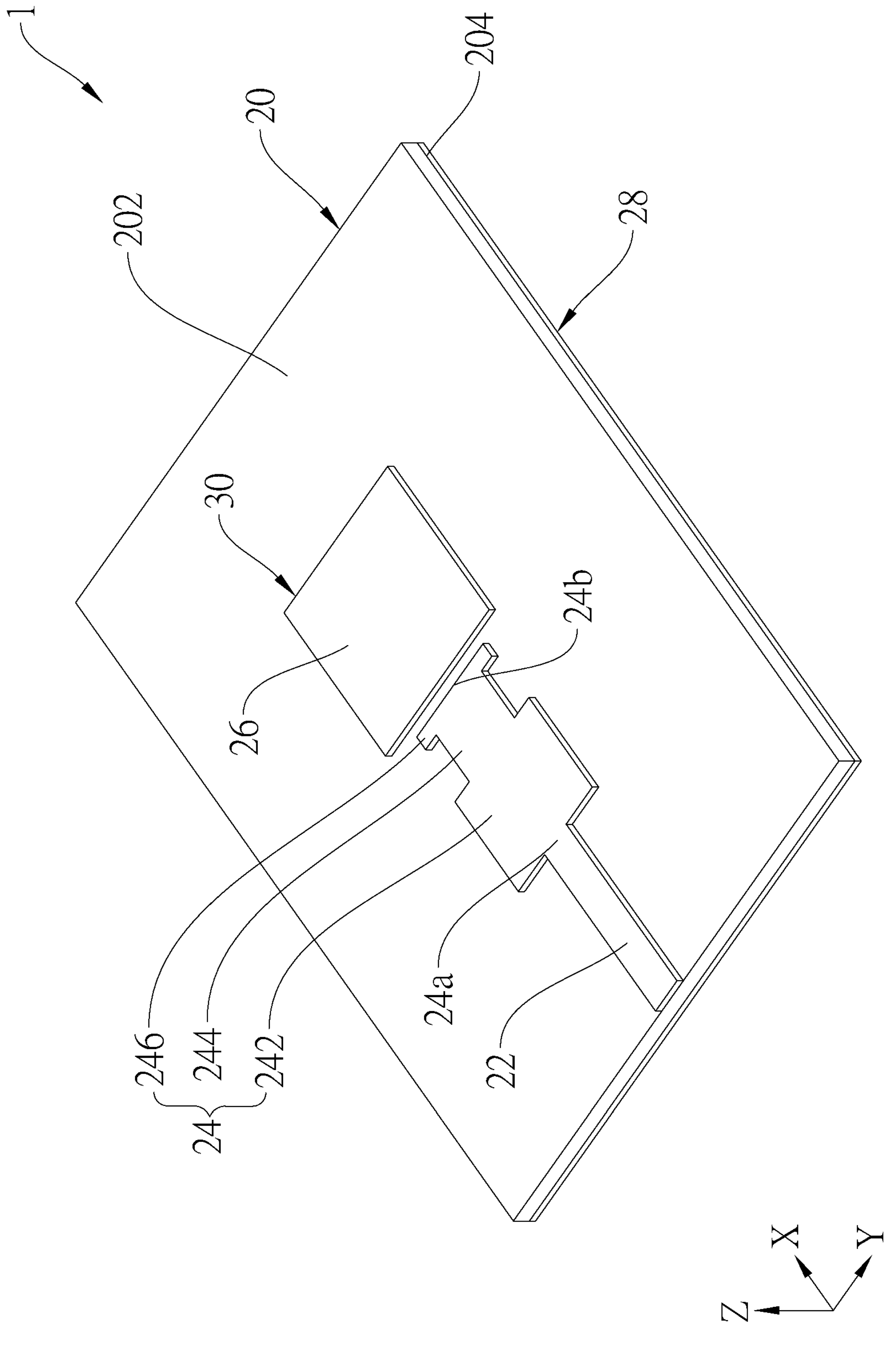
FIG. 4 is a perspective view of the microstrip antenna according to a first embodiment of the present invention.
Figure 5:
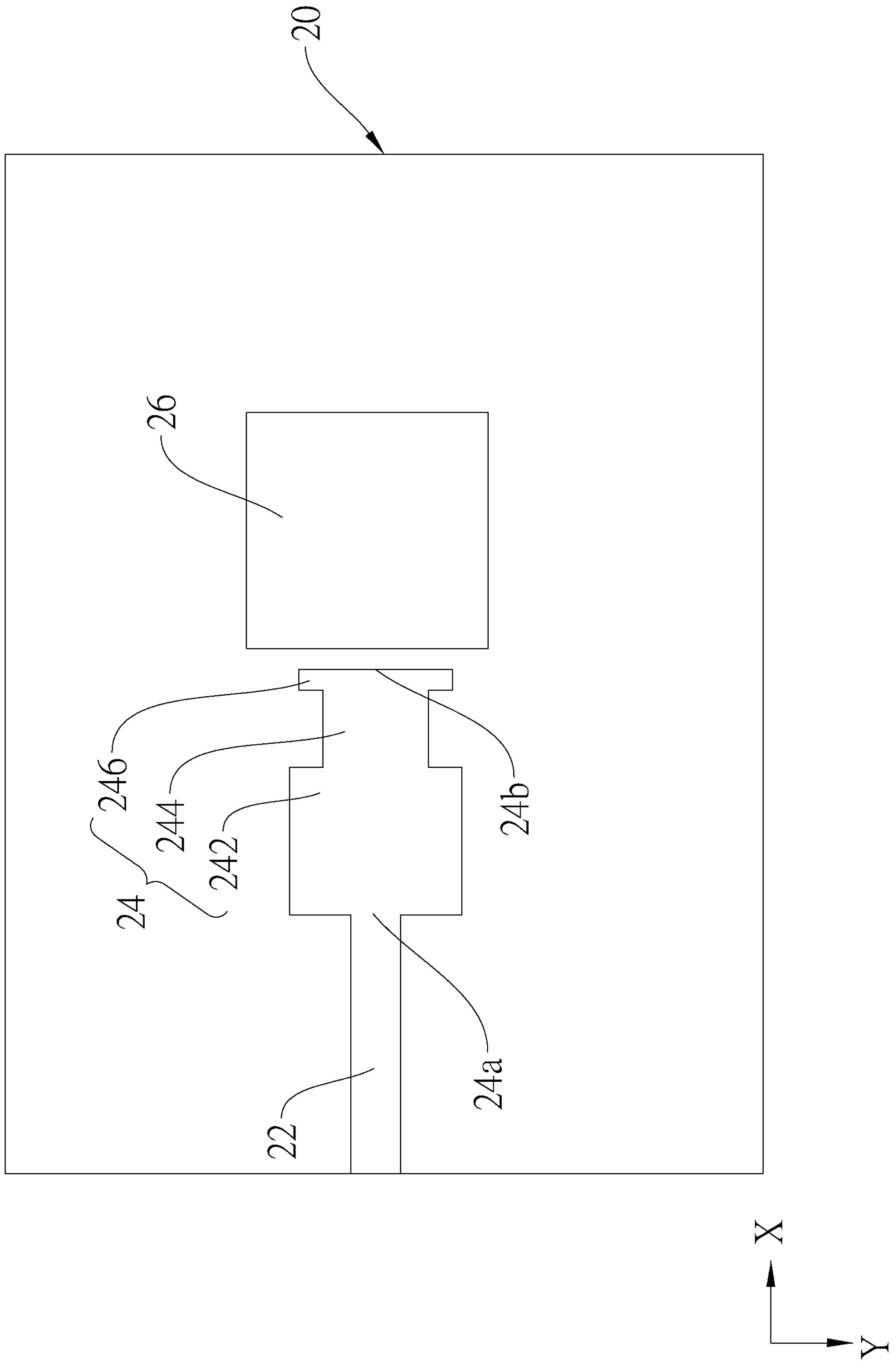
FIG. 5 is a top view of the microstrip antenna according to the first embodiment of the present invention.
Figure 6:
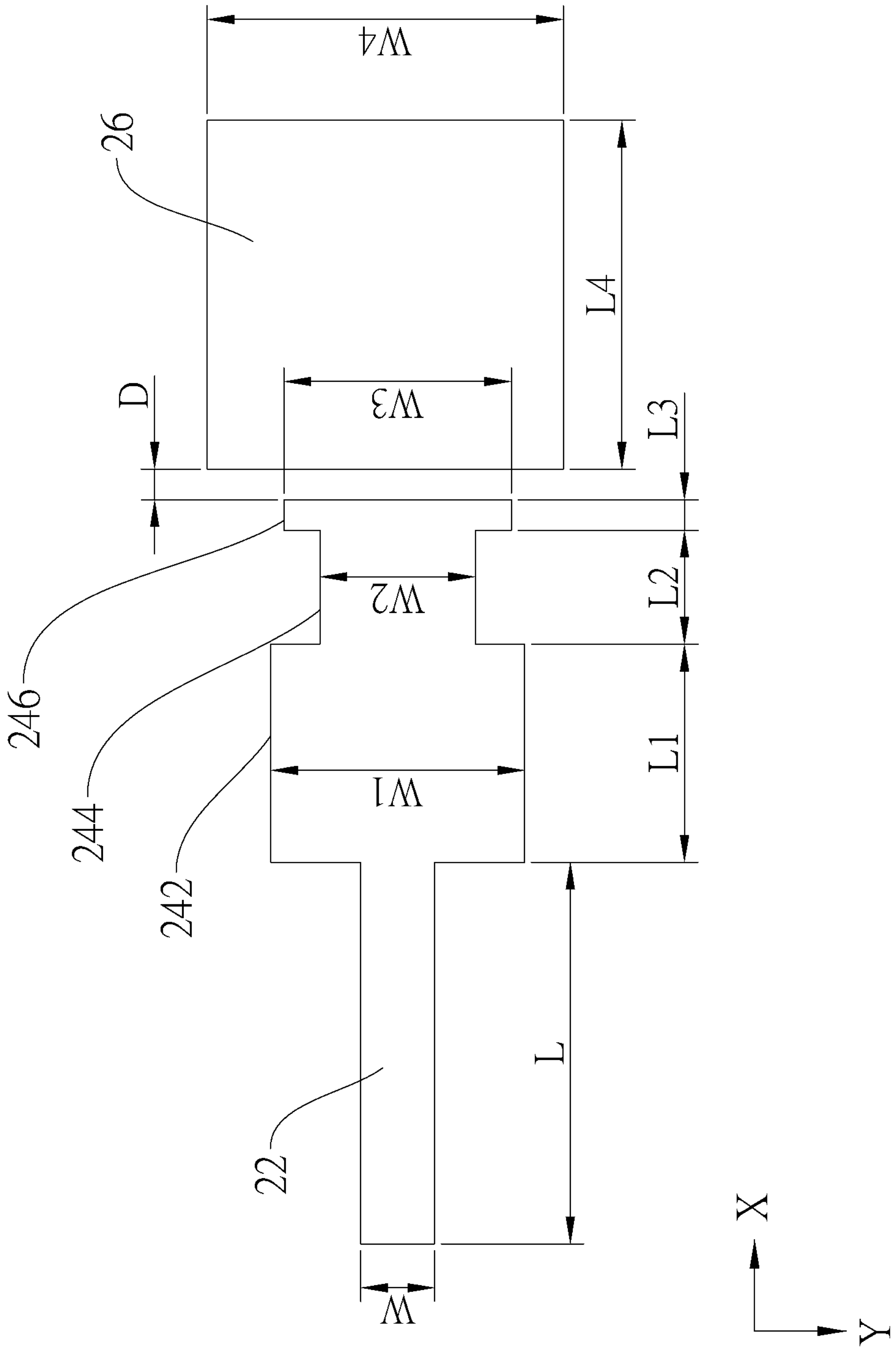
FIG. 6 is a schematic view of the microstrip antenna according to the first embodiment of the present invention, showing the distance D, the lengths L to L4, and the widths W to W4.

A microstrip antenna 1 according to a first embodiment of the present invention is illustrated in FIG. 4 to FIG. 6 and includes a substrate 20, a feedline 22, an impedance matching structure 24, and a patch radiator 26. In the current embodiment, the microstrip antenna 1 is a millimeter wave antenna applied to a radar at 60 GHz as an example. In order to illustrate easily, a first axial direction X, a second axial direction Y, and a third axial direction Z which are perpendicular to one another should be interpreted from a perspective view in FIG. 4.

The substrate 20 has two opposite surfaces (i.e., a top surface 202 and a bottom surface 204 in the third axial direction Z), wherein the top surface 202 and the bottom surface 204 respectively are perpendicular to the first axial direction X and second axial direction Y. The top surface 202 is for disposing the feedline 22, the impedance matching structure 24, and the patch radiator 26. A metal layer 28 is disposed on the bottom surface 204, wherein a thickness of the metal layer 28 in the third axial direction Z is, but not limited to, about 0.05 mm. In the current embodiment, the substrate 20 is made of RO4350 as an example, which could also be made of RO4835, RO3003, or a ceramic substrate. A thickness of the substrate 20 in the third axial direction Z ranges between 0.127 mm and 0.2 mm, wherein the thickness of the substrate 20 in the third axial direction Z in the current embodiment is 0.17 mm as an example.

The feedline 22, the impedance matching structure 24, and the patch radiator 26 construct a metal layer 30 and are laid out in order along the first axial direction X on the top surface 202 of the substrate 20. A thickness of the metal layer 30 in the third axial direction Z is 0.05 mm as an example.

The feedline 22 is a rectangular line, wherein a longitudinal direction of the feedline 22 extends along the first axial direction X. The feedline 22 has a constant width W in the second axial direction Y. In the current embodiment, the width W of the feedline 22 in the second axial direction Y is 0.24 mm as an example, and a length L of the feedline 22 in the first axial direction X is, but not limited to, 1.25 mm. An impedance of the feedline 22 is 50 ohms. An end of the feedline 22 extends to a side edge of the substrate 20, and is adapted to be a feeding end of a signal.

The impedance matching structure 24 is adapted to adjust an impedance and has a first end 24*a* and a second end 24*b* opposite to the first end 24*a* in the first axial direction X, wherein the first end 24*a* is connected to the feedline 22, and the second end 24*b* is adjacent to the patch radiator 26 without direct contact. In the current embodiment, the impedance matching structure 24 includes a first section 242, a second section 244, and a third section 246 in the first axial direction X, wherein the first section 242 has the first end 24*a*, the second section 244 is connected between the first section 242 and the third section 246, and the third section 246 has the second end 24*b*.

The first section 242 has a first width W1 in the second axial direction Y, the second section 244 has a second width W2 in the second axial direction Y, and the third section 246 has a third width W3 in the second axial direction Y. In the current embodiment, the first width W1 of the first section 242 is a constant, the second width W2 of the second section 244 is a constant, and the third width W3 of the third section 246 is a constant. The second width W2 is smaller than the first width W1 and the third width W3, and the third width W3 is smaller than or equal to the first width W1. In the current embodiment, the first width W1 is 0.83 mm as an example, the second width W2 is 0.5252 mm as an example, and the third width W3 is 0.7452 mm as an example. The first width W1 is about 1.580 times the second width W2, and the third width W3 is about 1.419 times the second width W2.

The first section 242 has a first length L1 in the first axial direction X, the second section 244 has a second length L2 in the first axial direction X, and the third section 246 has a third length L3 in the first axial direction X. The second length L2 is at least 3 times the third length L3, and the first length L1 is at least 7 times the third length L3. In the current embodiment, the first length L1 is 0.715 mm as an example, the second length L2 is 0.372 mm as an example, the third length L3 is 0.1 mm as an example, and a sum of the first length L1, the second length L2, and the third length L3 (i.e., a length from the first end 24*a* to the second end 24*b*) is, but not limited to, about 1.187 mm. The first length L1 is 7.15 times the third length L3, and the second length L2 is 3.72 times the third length L3.

The patch radiator 26 and the second end 24*b* of the impedance matching structure 24 are adjacent and spaced by a distance D in the first axial direction X, wherein the second end 24*b* of the impedance matching structure 24 is coupled with the patch radiator 26 through the distance D. In the current embodiment, the distance D ranges between 0.1 mm and 0.2 mm. The patch radiator 26 is a rectangular shape and has a fourth length L4 in the first axial direction X and a fourth width W4 in second axial direction Y. In the current embodiment, the fourth width W4 is larger than the third width W3 and the first width W1. The fourth length L4 could be similar to or equal to the sum of the first length L1, the second length L2, and the third length L3. In the current embodiment, the fourth length L4 is, but not limited to, slightly smaller than the sum of the first length L1 to the third length L3. The fourth length L4 could be equal to or slightly larger than the sum of the first length L1 to the third length L3. Preferably, an absolute value of a difference between the fourth length L4 and the sum of the first length L1 to the third length L3 is less than or equal to 0.05 mm. In the current embodiment, the distance D is, but not limited to, 0.1 mm, the fourth length L4 is 1.143 mm as an example, and the fourth width W4 is 1.168 mm as an example.

Figure 7:
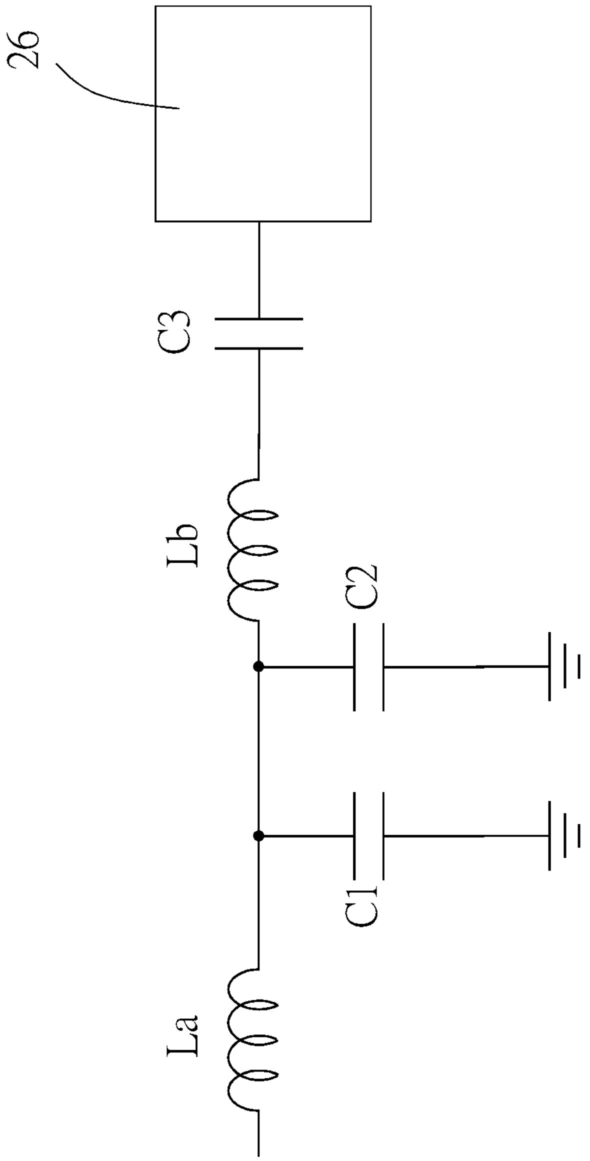
FIG. 7 is a schematic view showing an equivalent circuit of the microstrip antenna according to the first embodiment of the present invention.

An equivalent circuit of the microstrip antenna 1 is shown in FIG. 7, wherein the feedline 22 is equivalent to an inductance La, the first section 242 of the impedance matching structure 24 is equivalent to a capacitance C1, the second section 244 is equivalent to a capacitance C2 and an inductance Lb, and a space between the third section 246 and the patch radiator 26 accompanying with the distance D is equivalent to a parasitic capacitance C3.

The first section 242, the second section 244, and the third section 246 of the impedance matching structure 24 form a stepped impedance change, wherein an energy loss caused by a rapid impedance change could be reduced through the stepped impedance change, and a bandwidth could be increased due to the parasitic capacitance C3 formed in the distance D that feeds an energy to the patch radiator 26 in a coupling way. A capacitance value of the parasitic capacitance C3 could be correspondingly adjusted by adjusting the third width W3 of the third section 246, thereby obtaining the needed bandwidth.

Figure 8:
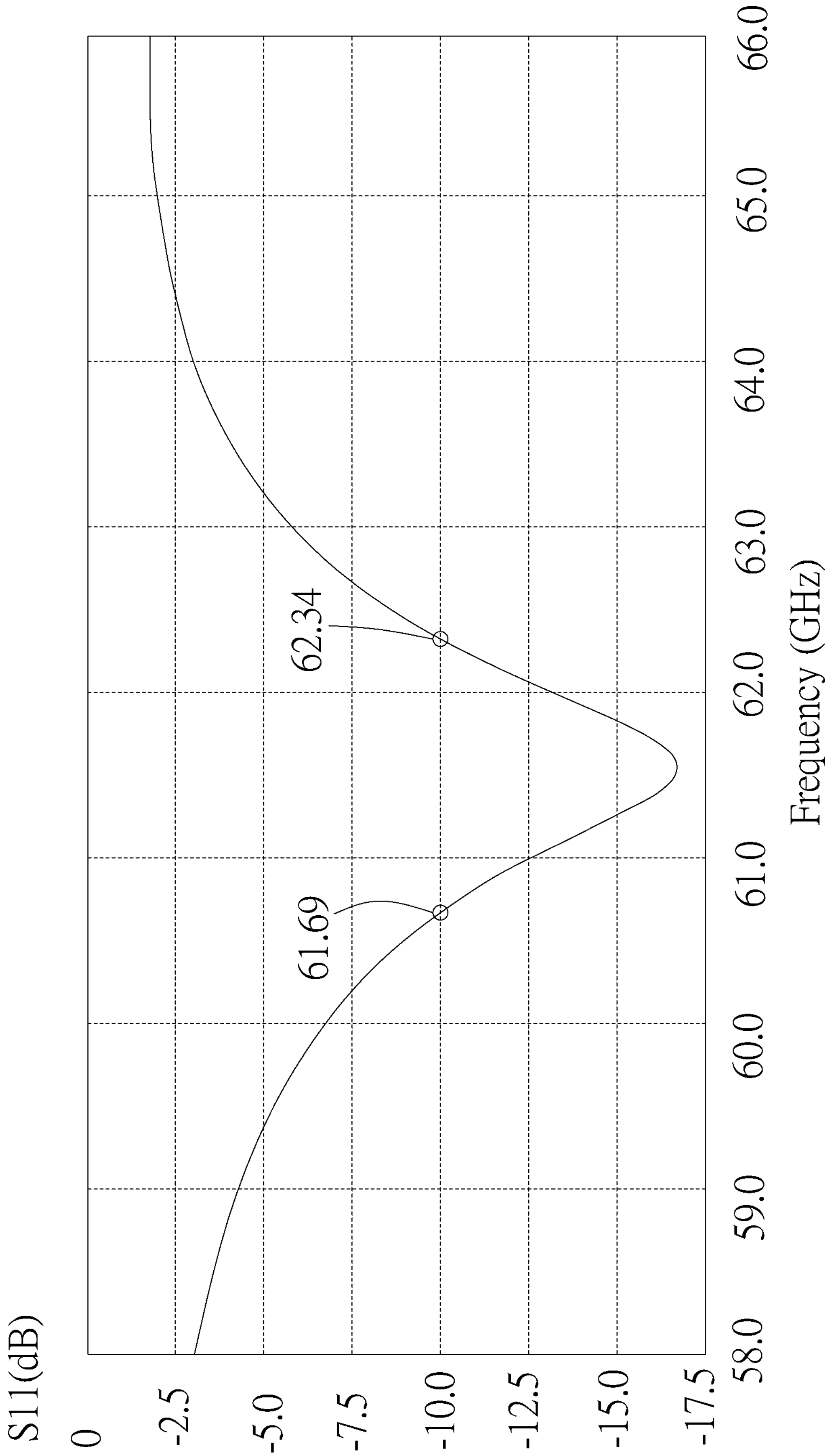
FIG. 8 is a schematic view showing a return loss of the microstrip antenna according to the first embodiment of the present invention operating between 58 GHz and 66 GHz.

FIG. 8 is a schematic view showing a S11 return loss of the microstrip antenna 1 operating between 58 GHz and 66 GHz, wherein a frequency of the microstrip antenna 1 at −10 dB is between 60.69 GHz and 62.34 GHz (i.e., a bandwidth of the microstrip antenna 1 is 1.65 GHz), and a fractional bandwidth (FBW) is about 2.682%. Compared with a conventional embedded microstrip antenna having a bandwidth of 1.47 GHz and a fractional bandwidth of 2.375%, the microstrip antenna 1 in the current embodiment could effectively increase the bandwidth, thereby providing a greater resolution.

Figure 9:
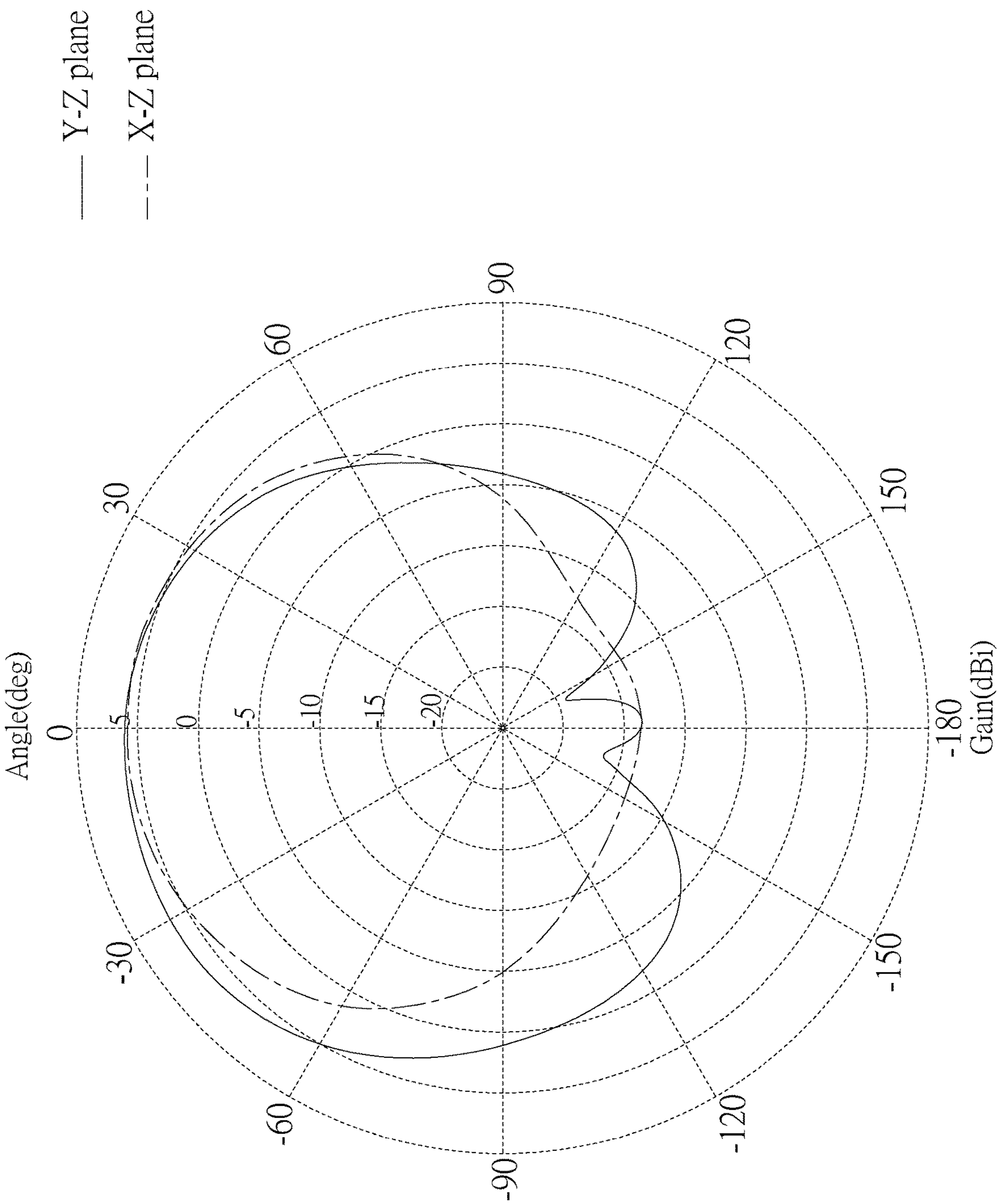
FIG. 9 is a schematic view showing a radiation pattern of the microstrip antenna according to the first embodiment of the present invention operating at 60 GHz.

FIG. 9 is a schematic view showing a radiation pattern in a Y-Z plane and a radiation pattern in an X-Z plane of the microstrip antenna 1 in the current embodiment operating at 60 GHz and shows that a peak gain of the microstrip antenna 1 is about 6.4 dBi, wherein the Y-Z plane is a plane constructed by the second axial direction Y and the third axial direction Z, and the X-Z plane is a plane constructed by the first axial direction X and the third axial direction Z.

Figure 10:
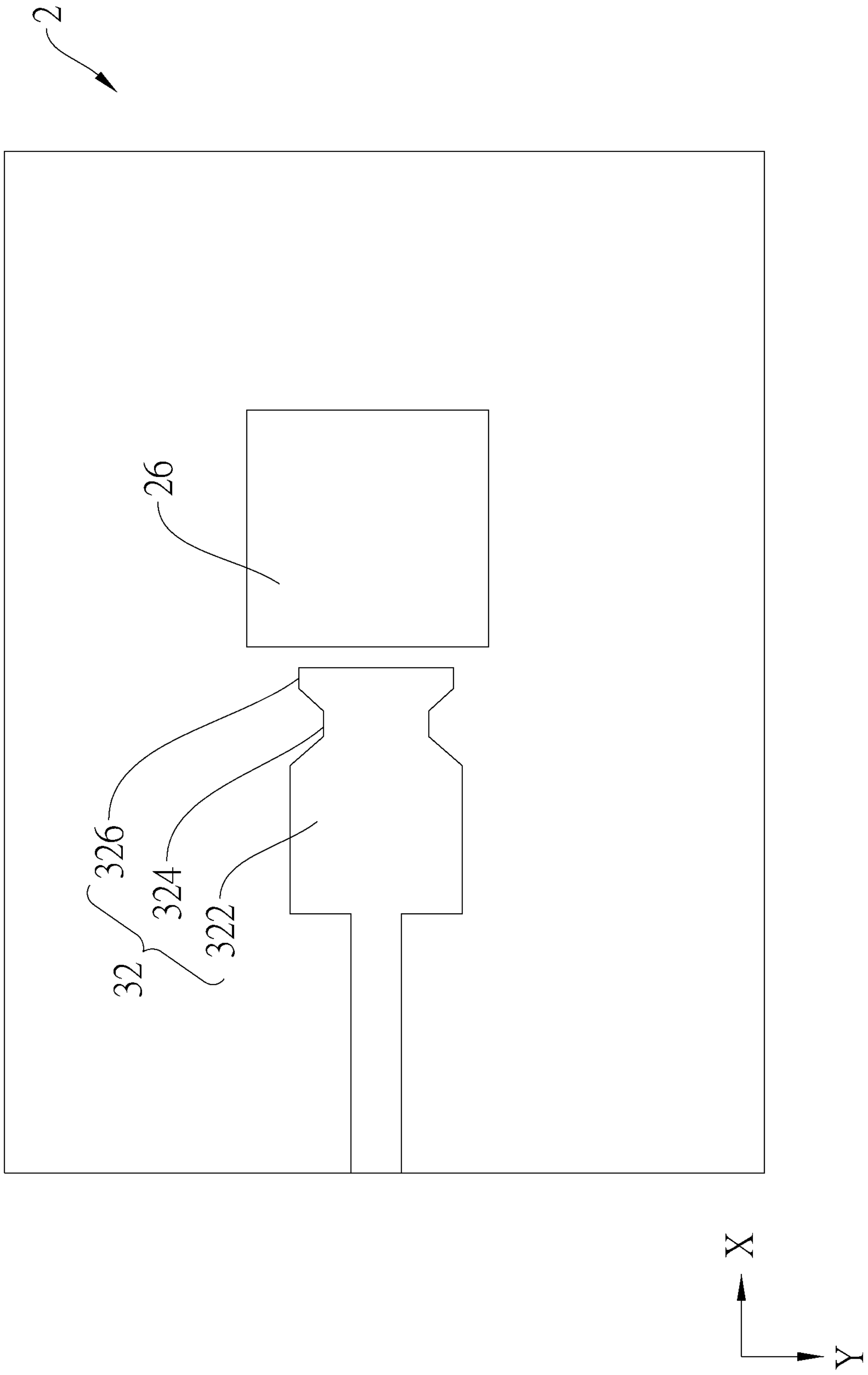
FIG. 10 is a top view of the microstrip antenna according to a second embodiment of the present invention.

A microstrip antenna 2 according to a second embodiment of the present invention is shown in FIG. 10 and has almost the same structure as that of the first embodiment, except that a width of a second section 324 of an impedance matching structure 32 changes along the first axial direction X, wherein the width of the second section 324 gradually decreases and then gradually increases in a direction from a first section 322 to a third section 326. The impedance matching structure 32 in the current embodiment could provide a stepped impedance change to reduce an energy loss caused by a rapid impedance change as well, and could feed an energy to the patch radiator 26 in a coupling way to increase a bandwidth.

It must be pointed out that the embodiments described above are only some preferred embodiments of the present invention. All equivalent structures which employ the concepts disclosed in this specification and the appended claims should fall within the scope of the present invention.

What is claimed is:

1. A microstrip antenna, comprising:

a substrate having a surface;

a feedline disposed on the surface and extending along a first axial direction;

an impedance matching structure disposed on the surface and having a first end and a second end in the first axial direction, wherein the first end is connected to the feedline; the impedance matching structure has a first section, a second section, and a third section in the first axial direction, wherein the first section has the first end, the third section has the second end, and the second section is located between the first section and the third section; the first section has a first width in a second axial direction perpendicular to the first axial direction, the second section has a second width in the second axial direction, and the third section has a third width in the second axial direction, wherein the second width is smaller than the first width and the third width; and a patch radiator disposed on the surface, wherein the patch radiator and the second end of the impedance matching structure are adjacent and spaced by a distance in the first axial direction, and the second end of the impedance matching structure is coupled with the patch radiator through the distance, wherein the first section of the impedance matching structure has a first length in the first axial direction, the second section of the impedance matching structure has a second length in the first axial direction, and the third section of the impedance matching structure has a third length in the first axial direction; the third length is smaller than the second length, and the second length is smaller than the first length.

2. The microstrip antenna as claimed in claim 1, wherein the third width is smaller than or equal to the first width.

3. The microstrip antenna as claimed in claim 1, wherein the second length is at least three times the third length.

4. The microstrip antenna as claimed in claim 3, wherein the first length is at least 7 times the third length.

5. The microstrip antenna as claimed in claim 1, wherein the patch radiator has a fourth width in the second axial direction, and the fourth width is larger than the third width and the first width.

6. The microstrip antenna as claimed in claim 1, wherein the distance ranges between 0.1 mm and 0.2 mm.

* * * * *